US012581422B2

(12) United States Patent
Klomsdorf et al.

(10) Patent No.: US 12,581,422 B2
(45) Date of Patent: Mar. 17, 2026

(54) UNEQUAL ADDITIONAL MAXIMUM POWER REDUCTION FOR DUAL TRANSMIT MODES

(71) Applicant: MOTOROLA MOBILITY LLC, Wilmington, DE (US)

(72) Inventors: Armin W Klomsdorf, Chicago, IL (US); John R Mura, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 428 days.

(21) Appl. No.: 18/184,123

(22) Filed: Mar. 15, 2023

(65) Prior Publication Data

US 2024/0314698 A1     Sep. 19, 2024

(51) Int. Cl.
*H04W 52/14*          (2009.01)
*H04W 52/18*          (2009.01)
*H04W 52/42*          (2009.01)

(52) U.S. Cl.
CPC ......... *H04W 52/146* (2013.01); *H04W 52/18* (2013.01); *H04W 52/42* (2013.01)

(58) Field of Classification Search
CPC ............... H04W 52/146; H04W 52/18; H04W 52/42; H04W 52/346; H04W 52/367; H04B 17/102
See application file for complete search history.

(56)         References Cited

U.S. PATENT DOCUMENTS

| | | | |
|---|---|---|---|
| 2021/0211992 A1* | 7/2021 | MolavianJazi ..... | H04W 52/146 |
| 2021/0258132 A1* | 8/2021 | Huang .............. | H04W 72/0453 |
| 2023/0396397 A1* | 12/2023 | Srivastava ........... | H04L 5/0092 |
| 2023/0397126 A1* | 12/2023 | Chen ....................... | H04B 7/04 |

* cited by examiner

*Primary Examiner* — John J Lee
(74) *Attorney, Agent, or Firm* — Isidore PLLC

(57)         ABSTRACT

A communication device, method and computer program product optimized additional maximum power reduction (A-MPR) during cooperative concurrent uplink transmission. The communication device configures a communications subsystem to perform cooperative concurrent uplink transmissions mode(s). The communications subsystem has transmit chains that include a first transmit chain and a second transmit chain. In response to determining that the first transmit chain has a higher system efficiency level than the second transmit chain, the controller allocates a larger portion of transmit power to the first transmit chain and a smaller portion of the transmit power to the second transmit chain to reduce overall power consumption by the communications subsystem. In response to determining that the first and second transmit chains have an equal efficiency level, the controller allocates equal transmit power to the first and second transmit chains. The controller configures the communications subsystem to communicate an uplink using the allocated power.

20 Claims, 7 Drawing Sheets

| | Efficiency Improvement (%) | Power Reduction (W) |
|---|---|---|
| Post PA insertion loss delta is 1dB (4dB and 5dB post PA loss) | | |
| MPR 0.5 | 2.2 | 0.16 |
| MPR 1 | 3.5 | 0.21 |
| MPR 2 (ex CP-OFDM w/ QPSK for UL MIMO) | 6 | 0.27 |
| MPR 3 (Second PA is effectively off) | 8.74 | 0.30 |
| MPR 3 (First PA back down 1 dB, second PA is still partially on) | 7.20 | 0.25 |
| Post PA insertion loss delta is 1dB (4 dB and 6 dB post PA loss) | | |
| MPR 0.5 | 4.5 | 0.36 |
| MPR 1 | 7.8 | 0.52 |
| MPR 2 | 17.5 | 0.86 |
| MPR 3 (Second PA is effectively off) | 28.19 | 0.98 |
| MPR 3 (First PA back down 1 dB, second PA is still partially on) | 17.07 | 0.65 |

FIG. 3

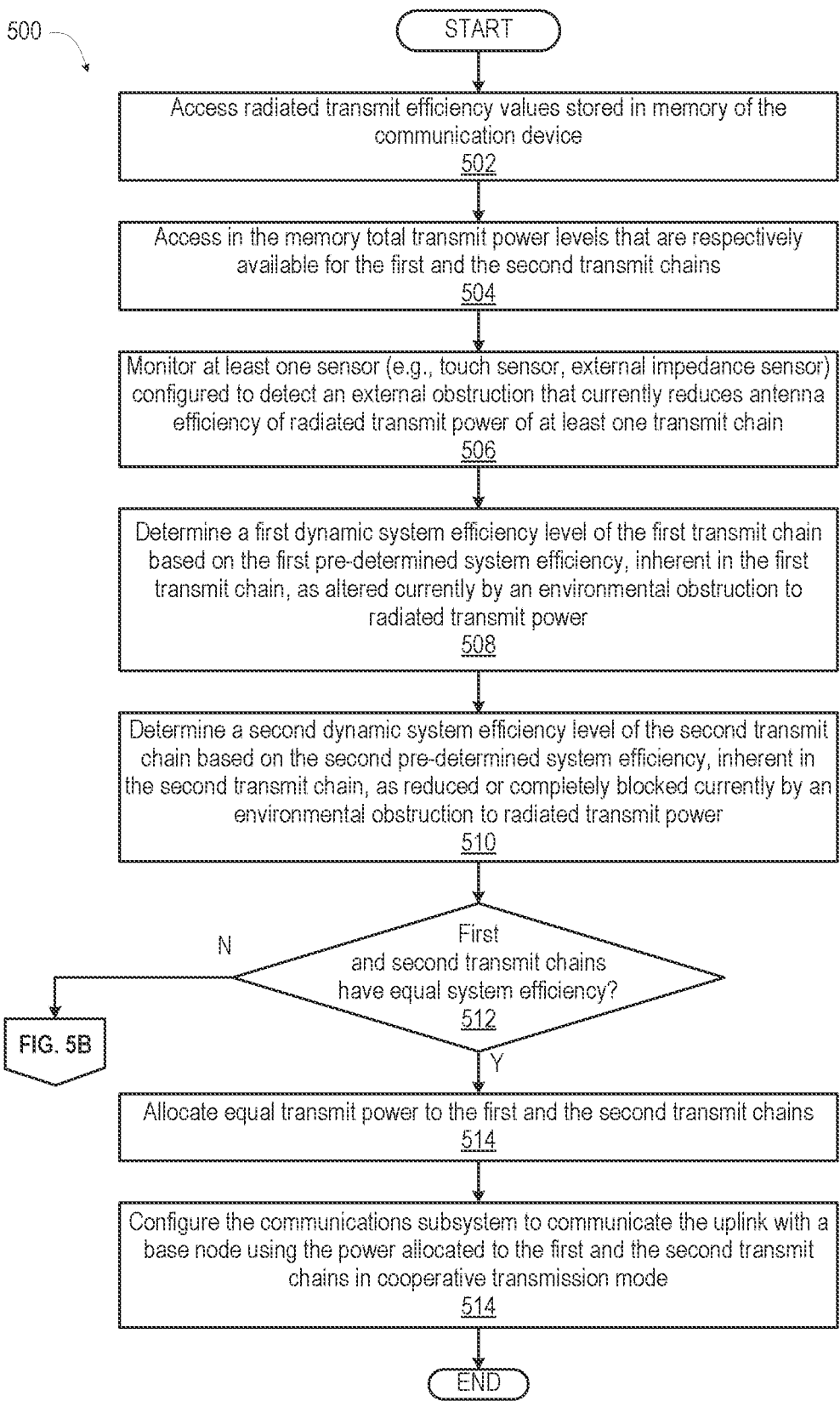

500

START

Access radiated transmit efficiency values stored in memory of the communication device
502

Access in the memory total transmit power levels that are respectively available for the first and the second transmit chains
504

Monitor at least one sensor (e.g., touch sensor, external impedance sensor) configured to detect an external obstruction that currently reduces antenna efficiency of radiated transmit power of at least one transmit chain
506

Determine a first dynamic system efficiency level of the first transmit chain based on the first pre-determined system efficiency, inherent in the first transmit chain, as altered currently by an environmental obstruction to radiated transmit power
508

Determine a second dynamic system efficiency level of the second transmit chain based on the second pre-determined system efficiency, inherent in the second transmit chain, as reduced or completely blocked currently by an environmental obstruction to radiated transmit power
510

First and second transmit chains have equal system efficiency?
512

Allocate equal transmit power to the first and the second transmit chains
514

Configure the communications subsystem to communicate the uplink with a base node using the power allocated to the first and the second transmit chains in cooperative transmission mode
514

END

*FIG. 5A*

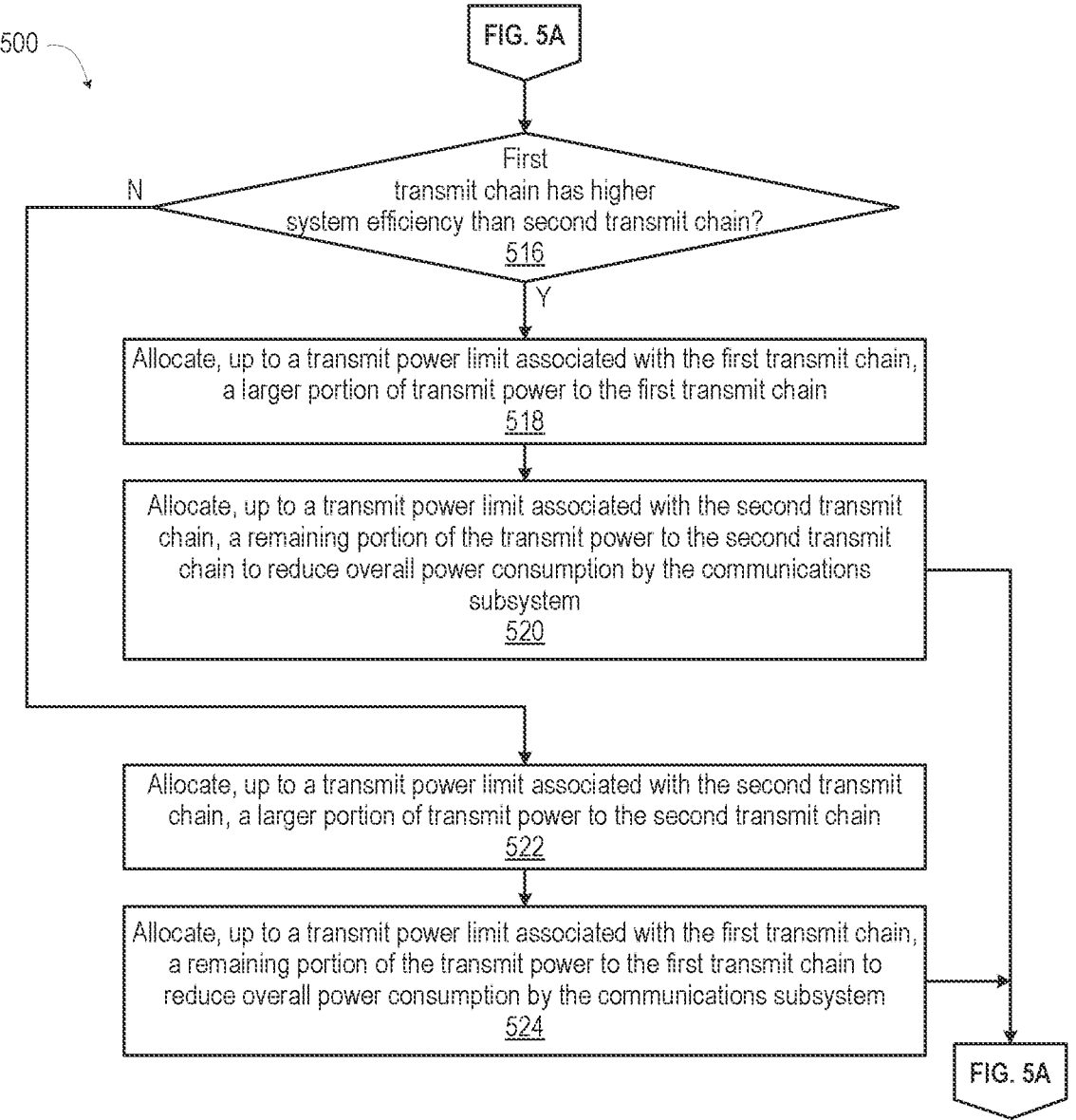

First
transmit chain has higher
system efficiency than second transmit chain?
516

N

Y

Allocate, up to a transmit power limit associated with the first transmit chain,
a larger portion of transmit power to the first transmit chain
518

Allocate, up to a transmit power limit associated with the second transmit
chain, a remaining portion of the transmit power to the second transmit
chain to reduce overall power consumption by the communications
subsystem
520

Allocate, up to a transmit power limit associated with the second transmit
chain, a larger portion of transmit power to the second transmit chain
522

Allocate, up to a transmit power limit associated with the first transmit chain,
a remaining portion of the transmit power to the first transmit chain to
reduce overall power consumption by the communications subsystem
524

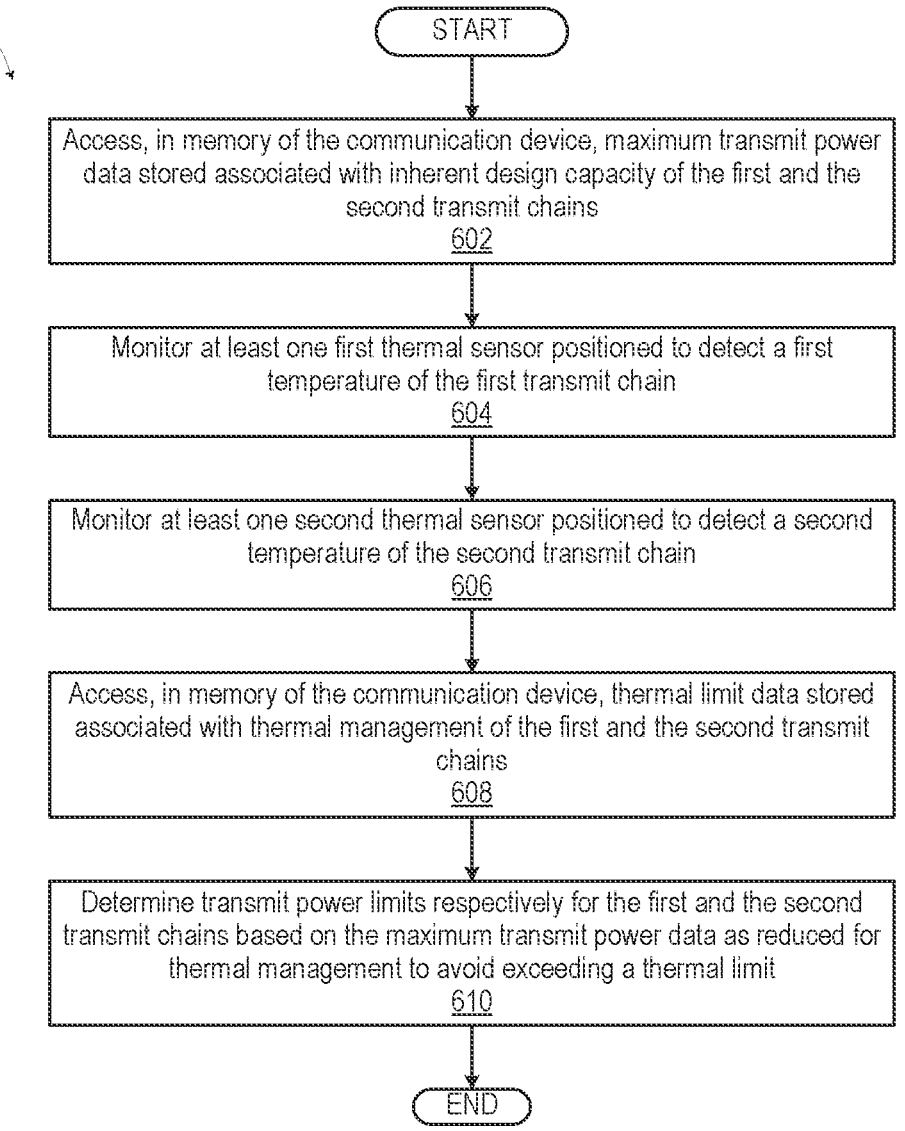

START

Access, in memory of the communication device, maximum transmit power data stored associated with inherent design capacity of the first and the second transmit chains
602

Monitor at least one first thermal sensor positioned to detect a first temperature of the first transmit chain
604

Monitor at least one second thermal sensor positioned to detect a second temperature of the second transmit chain
606

Access, in memory of the communication device, thermal limit data stored associated with thermal management of the first and the second transmit chains
608

Determine transmit power limits respectively for the first and the second transmit chains based on the maximum transmit power data as reduced for thermal management to avoid exceeding a thermal limit
610

END

*FIG. 6*

UNEQUAL ADDITIONAL MAXIMUM POWER REDUCTION FOR DUAL TRANSMIT MODES

1. TECHNICAL FIELD

The present disclosure relates generally to a communication device that supports simultaneous transmissions and more particularly to a communication device that supports cooperative concurrent uplink transmissions using more than one transmit chain.

2. DESCRIPTION OF THE RELATED ART

Communication devices are increasingly being designed to support concurrent uplink transmission via more than one transmit chain. For example, in moving from fourth generation long term evolved (LTE) radio access technology (RAT) to fifth generation new radio (5G NR) RAT, communication devices typically have increased the number of transmit chains that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter and two Wi-Fi transmitters in MIMO operation. 5G non-standalone (NSA) mode is an option for 5G NR deployment. NSA mode is also referred to as evolved UMTS radio access network and new radio dual connectivity (ENDC) or merely "dual connectivity". Dual connectivity refers to possible concurrent uplink transmission by an LTE transmitter and by a 5G NR transmitter. The multiple transmit chains may also be operated for spatial diversity, selecting antennas that are not blocked by proximity of the antennas to a user's body.

Communication devices are allowed by a scheduling base node to reduce the maximum output power due to higher order modulations and transmit bandwidth configurations, which is referred to as maximum power reduction (MPR). Additional maximum power reduction (A-MPR) provides for additional emission requirements that can be signaled by the network. The total reduction to user equipment (UE) maximum output power is the maximum of MPR and A-MPR. When encountering a need to reduce maximum output power, the UE sets MPR or A-MPR equally for both transmit chains.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 depicts TABLE A, which provides results for unequal power for dual transmit maximum power reduction (MPR) cases, according to one or more embodiments;

FIGS. 5A-5B (collectively "FIG. 5") provide a flow diagram presenting a method for determining efficiency for radiated transmit power based on inherent steady-state system efficiency and dynamic system efficiency as affected by external obstacles, according to one or more embodiments; and FIG. 6 provides a flow diagram presenting a method for limiting total transmit power respectively for each transmit chain such as for thermal management in addition to allocation of MPR/A-MPR for system efficiency, according to one or more embodiments.

DETAILED DESCRIPTION

Figure 1:
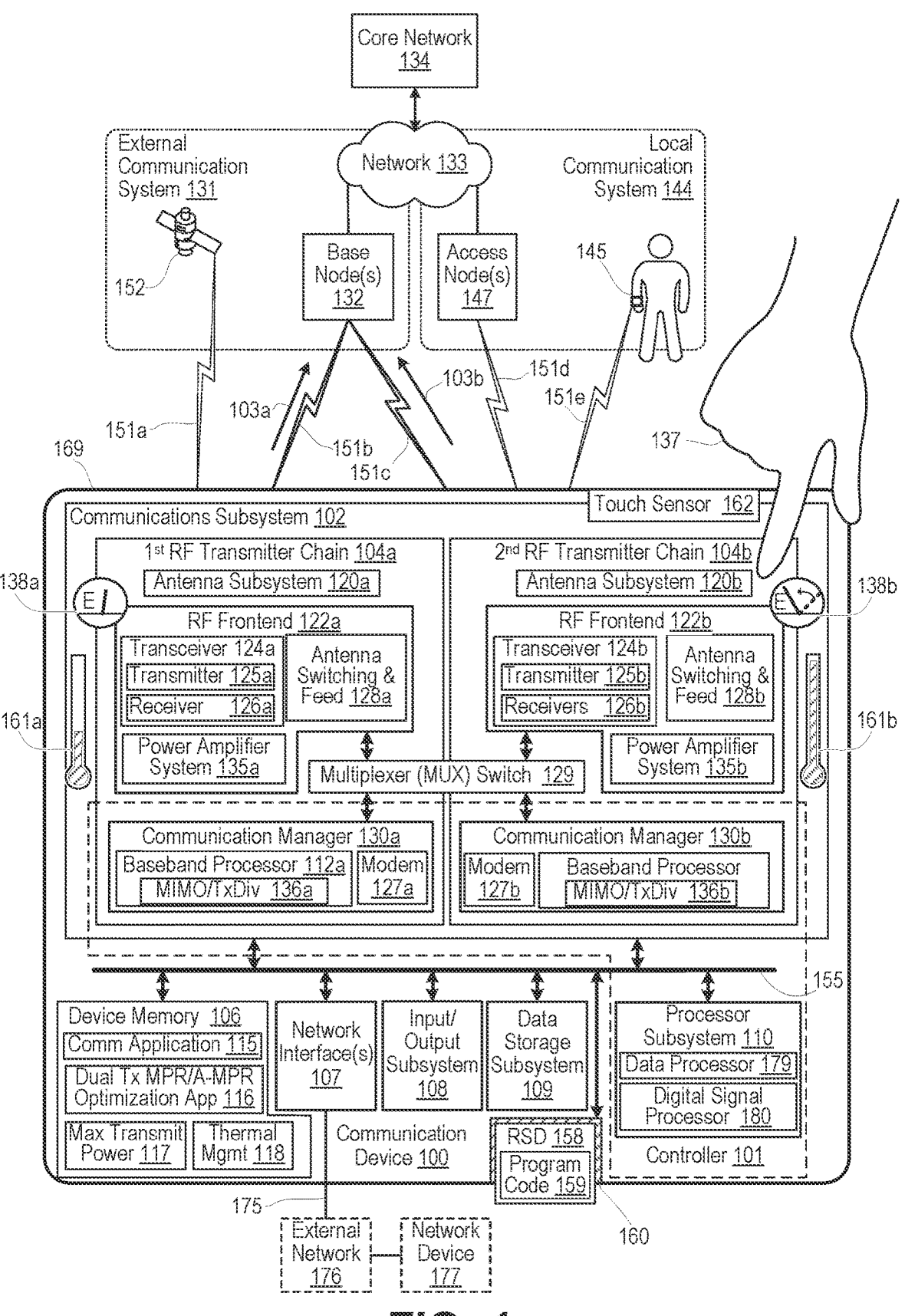
FIG. 1 depicts a functional block diagram of a communication environment including a communication device having a communications subsystem that supports multiple transmission uplinks that are configurable for optimized maximum power reduction (MPR)/additional maximum power reduction (A-MPR) during a cooperative uplink concurrent uplink transmission mode, according to one or more embodiments.

According to a first aspect of the present disclosure, a communication device, a method and a computer program product provide for optimized additional maximum power reduction (A-MPR) during a cooperative uplink concurrent uplink transmission mode. In one or more embodiments, the cooperative transmission mode is transmit diversity (TxDiv) mode. In one or more embodiments, the cooperative transmission mode is codebook based physical uplink shared channel (PUSCH) transmit with precoder [1 1] in single layer dual transmit precoder codebook. The communication device includes a communications subsystem having more than one transmit chains configurable to perform at least one cooperative concurrent uplink transmissions mode. The more than one transmit chains include at least a first transmit chain and a second transmit chain. A controller of the communication device is communicatively coupled to the communications subsystem. In response to determining that the first transmit chain has a higher system efficiency level than the second transmit chain, the controller allocates a larger portion of transmit power to the first transmit chain and a smaller portion of the transmit power to the second transmit chain to reduce overall power consumption by the communications subsystem. In response to determining that the first and the second transmit chains have an equal system efficiency level, the controller allocates equal transmit power to the first and the second transmit chains. The controller configures the communications subsystem to communicate an uplink with a base node using the power allocated to the first and the second transmit chains in cooperative transmission mode.

In the following detailed description of exemplary embodiments of the disclosure, specific exemplary embodiments in which the various aspects of the disclosure may be practiced are described in sufficient detail to enable those skilled in the art to practice the invention and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100 is an example electronic device (100) having communications subsystem 102 that supports multiple transmission uplinks 103*a*-103*b* by a plurality of radio frequency (RF) transmit chains 104*a*-104*b*, configurable for transmit diversity or MIMO modes in either a single data layer or a two or more data layer mode. For clarity, first and second transmit chains 104*a*-104*b* are depicted; however, communication device 100 can include more than two RF transmit chains. In addition, the plurality of RF transmit chains 104*a*-104*b* can include different subsets that support concurrent uplink transmission on different communication frequency bands.

Communication device 100 may perform transmit diversity or codebook based physical uplink shared channel (PUSCH) transmit with precoder [1 1] in single layer dual transmit precoder codebook in two or more different communication frequency bands.

Communication device 100 can be one of a host of different types of devices, including but not limited to, a mobile cellular phone, satellite phone, or smart phone, a laptop, a netbook, an ultra-book, a networked smartwatch or networked sports/exercise watch and/or a tablet computing device or similar device that can include wireless communication functionality. As a device supporting wireless communication, communication device 100 can be utilized as and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communications subsystem 102, communication device 100 includes controller 101, device memory 106, network interface(s) 107, input/output (I/O) subsystem 108 and data storage subsystem 109, each of which are managed by controller 101. Controller 101 may include or consist essentially of processor subsystem 110. In one or more embodiments, controller 101 also includes one or more baseband processors 112*a*-112*b* of respective RF transmit chains 104*a*-104*b*. Device memory 106 stores program code for applications, such as communication application 115, MPR/A-MPR application 116 and other application(s). Device memory 106 further includes an operating system (OS), a firmware interface, such as basic input/output system (BIOS) or Uniform Extensible Firmware Interface (UEFI) and firmware.

Controller 101 includes processor subsystem 110, which executes program code to provide operating functionality of communication device 100. The functionality includes (i) configuring communications subsystem 102 for transmit diversity (TxDiv) or MIMO to support increased transmit power or increase antenna efficiency, when necessary and (ii) configuring communications subsystem 102 for fewer transmit chains for power efficiency when satisfactory uplink signal quality is achievable. The software and/or firmware modules have varying functionality when their corresponding program code is executed by processor subsystem 110 or secondary processing devices within communication device 100. Processor subsystem 110 of controller 101 can execute program code of communication application 115, MPR/A-MPR application 116 and other application(s) to configure communication device 100 to perform specific functions. Device memory 106 can include data used by the applications. Controller 101 executes MPR/A-MPR application 116 to configure communication device 100 to manage MPR/A-MPR for efficient operation of RF transmit chains 104*a*-104*b* based at least in part on data that includes maximum transmit power data 117 and thermal management data 118.

Each RF transmit chain 104*a*-104*b* of communications subsystem 110 includes respective antenna subsystems 120*a*-120*b* that support multiple low, mid, high and ultra-high RF bands for wireless and cellular services. Each RF transmit chain 104*a*-104*b* includes respective RF frontends 122*a*-122*b* having one or more transceivers 124*a*-124*b* that includes one or more transmitters 125*a*-125*b* and one or more receivers 126*a* 126*b*. Multiplexer (MUX) switch 129 selectively connects communication managers 130*a*-130*b* to RF frontends 122*a*-122*b*. In one configuration, MUX switch 129 connects communication manager 130*a* to RF frontend 122*a* and connects communication manager 130*b* to RF frontend 122*b*, such as for uplink transmissions. In another configuration, MUX switch 129 connects either communication manager 130*a* to RF frontend 122*a* or connects communication manager 130*b* to RF frontend 122*b* with the other being inactive when not needed for transmit diversity or multiple independent transmissions. In an additional configuration, such as for TxDiv, MUX switch 129 connects one of communication managers 130*a*-130*b* to both RF frontends 122*a*-122*b* with the other communication manager 130*a*-130*b* being inactive. Each RF transmit chain 104*a*-104*b* includes respective ones of one or more modems 127*a*-127*b*. Each RF transmit chain 104*a*-104*b* respectively includes antenna tuning networks such as antenna switching and feed network 128*a*-128*b* respectively to connect particular antennas of antenna subsystems 120*a*-120*b* at a selected phase delay. Changes experienced by antenna switching and feed network 128*a*-128*b* can be used to detect proximity to person 137 that creates a blockage or that reduces radiated transmit power efficiency. The reduction may affect certain portions of one RF transmit chain 104*a*-104*b*, such as blocking certain antenna elements or antenna arrays of corresponding antenna subsystems 120*a*-120*b*. In an example, first RF transmit chain 104*a* is annotated with system efficiency ("E") gauge 138*a* have an inherent system efficiency that is less than second RF transmit chain 104*b*, which is annotated with E gauge 138*b*.

Inherent system efficiency relates to the performance of the entire RF transmit chain 104*a* and 104*b* in the amount of power consumed as compared to the resulting radiated power without effects of an external obstruction impairing antenna efficiency. Inherent system efficiency includes power efficiencies of power supply components and power amplification components as well as antenna efficiency at particular frequency bands of an uplink. As used herein, dynamic system efficiency is the system efficiency as degraded by an external obstruction impairing antenna efficiency and thereby reducing radiated transmit power. If additional power headroom remains, transmit power has to be increased with a corresponding increase in power consumption to maintain the same radiated transmit power. With proximity to person 137, E gauge 138*b* becomes less than E gauge 138*a*. The reduction in radiated transmit power efficiency may be a fractional reduction or an absolute blocking, preventing transmission. Power amplifier systems 135*a*-135*b* for respective RF frontends 122*a*-122*b* set the transmit power levels provided to antennas connected by antenna switching and feed network 128*a*-128*b*. In one or more embodiments, transmit power levels may be also dynamically capped or limited for thermal management considerations.

Each RF transmit chain 104*a*-104*b* includes respective communication manager 130*a*-130*b* having corresponding baseband processor 112*a*-112*b*. Baseband processors 112*a*-112*b* communicates with controller 101 and respective RF frontend 122*a*-122*b*. In one or more embodiments, baseband processor 112*a*-112*b* performs a primary or support function as part of controller 101. Communications subsystem 102 communicates with external communication system 131. Baseband processors 112*a*-112*b* operate in baseband frequency range to encode data for transmission and decode received data, according to a communication protocol. Baseband modems 127*a*-127*b* modulate baseband encoded data from corresponding communication managers 130*a*-130*b* onto a carrier signal to provide a transmit signal that is amplified by power amplifiers in transmitters 125*a*-125*b* and delivered to antennas. Baseband modems 127*a*-127*b* are respectively configured with MIMO/TxDiv components 136*a*-136*b* encode uplink signals and decode downlink signals that are communicated using MIMO or TxDiv.

Baseband modems 127*a*-127*b* demodulate received signals from external communication system 131 detected by corresponding antenna subsystem 120*a*-120*b*. The received signal is amplified and filtered by receivers 126*a* 126*b*, which demodulate received encoded data from a received carrier signal. In an example, communications subsystem communicates with cellular network or base nodes 132 that are part of one or more radio access network (RANs) to connect to communication network(s) 133. Communication network(s) 133 may be communicatively connected to core network 134.

In other applications, local communication system 144 can include localized or personal devices 145, such as a wireless headset, head mounted display and a smart watch. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via base nodes 132.

Communications subsystem 102 can concurrently transmit multiple uplink channels and receive multiple downlink channels. Communications subsystem 102 also supports other types of communication. In an example, communications subsystem 102 receives satellite broadcast signals 151*a* from GPS satellites 152. Communications subsystem 102 communicates with base nodes 132 via uplink/downlink channels 151*b*-151*c*. Communications subsystem 102 can communicate with access node 147 via transmit/receive signals 151*d*. Communications subsystem 102 communicates with localized or personal device 145 via transmit/receive signals 151*e*.

In one or more embodiments, controller 101, via communications subsystem 110, performs multiple types of cellular OTA or wireless communication with external communication system 131. Communications subsystem 110 can communicate via Bluetooth connection with one or more personal access network (PAN) devices such as localized or personal devices 145. Communication via Bluetooth connection includes both transmission and reception via a Bluetooth transceiver device. In one or more embodiments, communications subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s), such as the Internet. In one or more embodiments, communications subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code and stored data on nonvolatile storage that is accessible by controller 101. For example, data storage subsystem 109 can provide a selection of applications and computer data such as TxDiv/MIMO PS application 116. TxDiv/MIMO PS application 116 can be loaded into device memory 106 for execution by controller 101. In one or more embodiments, data storage device(s) can include hard disk drives (HDDs), optical disk drives and/or solid-state drives (SSDs), etc. Data storage subsystem 109 of communication device 100 can include one or more non-transitory computer readable storage devices or computer readable storage devices, such as removable storage device (RSD) 158 that contains program code 159 and that is received in RSD interface 160. Controller 101 is communicatively connected to RSD 158, via system interlink 155 and RSD interface 160. Controller 101 can access RSD 158 to provision communication device 100 with program code 159, such as code for TxDiv/MIMO PS application 116 and related computer data, that when executed by controller 101 configures computer device 100 to perform functionality described herein.

I/O subsystem 108 includes user interface components such as a display device that presents a user interface. I/O subsystem 108 may include acceleration/movement sensor(s), vibration output device, light output device, image capturing device(s), microphone(s), touch/haptic controls and audio output device(s). In particular, I/O subsystem 108 may include thermal sensors 161a and 161b positioned respectively to detect a thermal operating temperature of first and second transmitter chains 104a and 104b. I/O subsystem 108 may include touch sensor(s) 162 to detect person 137 blocking antenna subsystems 120a and 120b. I/O subsystem 108 also may include an I/O controller. The I/O controller provides communication and power signals to functional components described herein as part of communications subsystem 102, device memory 106, I/O subsystem 108, or data storage subsystem 109. The I/O controller is communicatively coupled to system interlink 155 and also to one or more electrical ports externally presented on housing 169 of communication device 100. Each electrical port may receive an electrical cable tethered to a respective peripheral device, which are external to housing 169 of communication device 100. Internal devices within housing 169 can include computing, storage, communication, or sensing components depicted within housing 169. The I/O controller supports the necessary configuration of connectors, electrical power, communication protocols and data buffering to act as an interface between internal devices and peripheral devices tethered by the electrical cable and other components of communication device 100 that uses a different configuration for inputs and outputs.

Network interface(s) 107 can include a network interface controller (NIC) with a network connection/cable 175 connection to external network 176. Network connection/cable 175 may include wireless and/or wired links. Network interface(s) 107 support one or more network communication protocols. External network 176 can be a local area network (LAN), a campus area network (CAN), a metropolitan area network (MAN), or a wide area network (WAN). For example, network connection/cable 175 can be an Ethernet connection/cable. Network device 177 is communicatively coupled to wired area network 176.

Controller 101 manages and in some instances directly controls, the various functions and/or operations of communication device 100. These functions and/or operations include, but are not limited to including, application data processing, communication with second communication devices, navigation tasks, image processing and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 179. Processor subsystem 110 can include one or more digital signal processors 180 that are integrated with data processor 179. Processor subsystem 110 can include other processors that are communicatively coupled to data processor 179, such as baseband processors 112a-112b of corresponding communication managers 130a-130b. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, data processor 179 is communicatively coupled via system interlink 155 to communications subsystem 102, I/O subsystem 108 and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 155) are illustrated in FIG. 1, it is to be understood that more, fewer, or different interconnections may be present in other embodiments.

Figure 2:
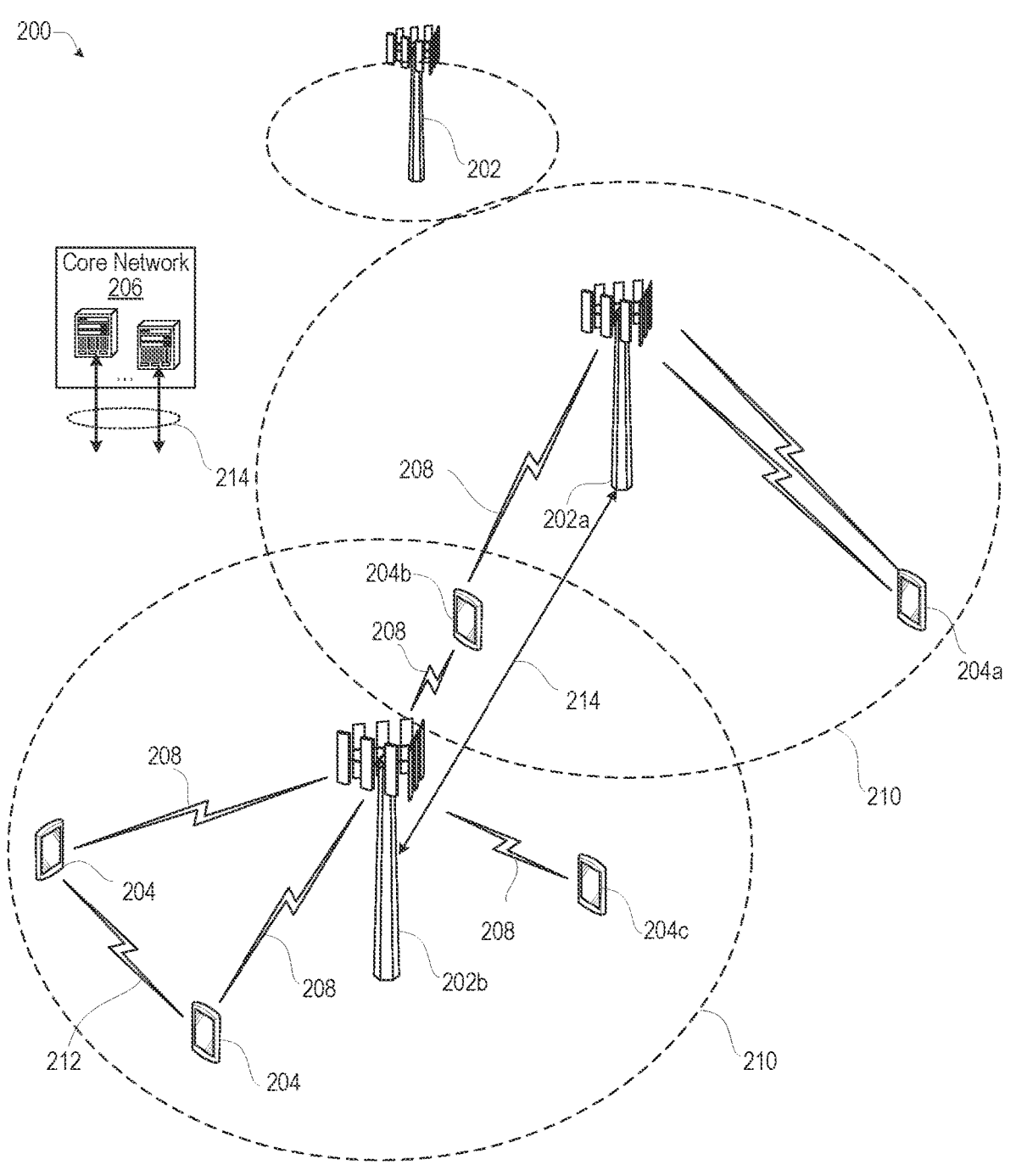
FIG. 2 depicts a wireless communications system that supports wireless communication with optimized MPR/A-MPR by the communication devices, according to one or more embodiments.

FIG. 2 illustrates an example of wireless communications system 200 that supports efficient A-MPR at a user equipment (UE) such as communication device 100, in accordance with aspects of the present disclosure. Wireless communications system 200 may include one or more base nodes 202, one or more user equipments (UEs) 204a, 204b and 204c (collectively "204") and core network 206. Wireless communications system 200 may support various radio access technologies. In some implementations, the wireless communications system 200 may be or may include a 4G network, such as an LTE network or an LTE-Advanced (LTE-A) network. In some other implementations, the wireless communications system 200 may be or may include a 5G network, such as a new radio (NR) network. In other implementations, wireless communications system 200 may be a combination of a 4G network and a 5G network. Wireless communications system 200 may support radio access technologies beyond 5G. Additionally, wireless communications system 200 may support different transmission modes, such as time division multiple access (TDMA), frequency division multiple access (FDMA), or code division multiple access (CDMA), etc.

One or more base nodes 202a-202b (collectively "202") may be dispersed throughout a geographic region to form the backbone infrastructure of wireless communications system 200. One or more of base nodes 202 described herein may be, may include, or may be referred to as a base transceiver station, an access point, a NodeB, an evolution NodeB (eNB), a next-generation NodeB (gNB), or other suitable terminology. Base nodes 202 and UEs 204 may communicate via communication links 208, which may be a wireless or wired connection. In an example, base node 202 and UE 204 may wirelessly communicate over a user unit (Uu) interface.

Base node 202 may provide geographic coverage area 210 for which base node 202 may support services (e.g., voice, video, packet data, messaging, broadcast, etc.) for one or more UEs 204 within geographic coverage area 210. For example, base node 202 and UE 204 may support wireless communication of signals related to services (e.g., voice, video, packet data, messaging, broadcast, etc.) according to one or multiple radio access technologies. In some implementations, base node 202 may be moveable. For example, base node 202 may be a satellite associated with a non-terrestrial network. In some implementations, different geographic coverage areas 210 associated with the same or different radio access technologies may overlap, but the different geographic coverage areas 210 may be associated with different base nodes 202. Information and signals described herein may be represented using any of a variety of different technologies and techniques. For example, data, instructions, commands, information, signals, bits, symbols and chips that may be referenced throughout the description may be represented by voltages, currents, electromagnetic waves, magnetic fields or particles, optical fields or particles, or any combination thereof.

One or more UEs 204 may be dispersed throughout a geographic region of wireless communications system 200. UE 204 may include or may be referred to as a mobile device, a wireless device, a remote device, a handheld device, or a subscriber device, or some other suitable terminology. In some implementations, UE 204 may be referred to as a unit, a station, a terminal, or a client, among other examples. Additionally, or alternatively, the UE 204 may be referred to as an Internet-of-Things (IoT) device, an Internet-of-Everything (IoE) device, or machine-type communication (MTC) device, among other examples. In some implementations, UE 204 may be stationary in wireless communications system 200. In some other implementations, UE 204 may be mobile in wireless communications system 200.

One or more UEs 204 may be devices in different forms or having different capabilities. UE 204 may be capable of communicating with various types of devices, such as base nodes 202, other UEs 204, or network equipment (e.g., core network 206, a relay device, an integrated access and backhaul (IAB) node, or another network equipment), as shown in FIG. 2. Additionally, or alternatively, UE 204 may support communication with other base nodes 202 or UEs 204, which may act as relays in the wireless communications system 200.

UE 204 may also be able to support wireless communication directly with other UEs 204 over communication link 212. For example, UE 204 may support wireless communication directly with another UE 204 over a device-to-device (D2D) communication link. In some implementations, such as vehicle-to-vehicle (V2V) deployments, vehicle-to-everything (V2X) deployments, or cellular-V2X deployments, the communication link 212 may be referred to as a sidelink. For example, a UE 204 may support wireless communication directly with another UE 204 over a PC5 interface. UEs 204 can use transmit diversity according to aspects of the present disclosure to increase transmit power levels in a power efficient manner.

Base node 202 may support communications with core network 206, or with another base node 202, or both. For example, base node 202 may interface with core network 206 through one or more backhaul links 214 (e.g., via an S1, N2, N2, or another network interface). The base nodes 202 may communicate with each other over backhaul links 214 (e.g., via X2, Xn, or another network interface). Core network 206 may support user authentication, access authorization, tracking, connectivity and other access, routing, or mobility functions. Core network 206 may be an evolved packet core (EPC), or a 5G core (5GC). UE 204*a* performs concurrent uplink transmission with base node 202*a*. The cooperative transmission mode may be one of: (i) transmit diversity (TxDiv) mode; and (ii) codebook based physical uplink shared channel (PUSCH) transmit with precoder [1 1] in single layer dual transmit precoder codebook. Dual transmit cases are becoming more common and will continue to grow in importance.

The present disclosure recognizes that significant current drain/thermal savings can be achieved if MPR is applied unevenly between transmitters. One or more aspects of the present disclosure involves modifying current/existing procedures that permit a UE to reduce MPR. In general, additional emission requirements can be signaled by the network. Each additional emission requirement is associated with a unique network signaling (NS) value, which is indicated in radio resource control (RRC) signaling by a 5G new radio (NR) frequency band number of the applicable operating band and an associated value in the field "additionalSpectrumEmission". An indication or signaling of an NS value refers to the corresponding indication of an NR frequency band number of the applicable operating band, the information element (IE) field "freqBandIndicatorNR", and an associated value "additionalSpectrumEmission" in the relevant RRC information elements. To meet the additional requirements, additional maximum power reduction (A-MPR) by the UE is allowed for the maximum output power. Generally, the total reduction to UE maximum output power is max(MPR, A-MPR) where MPR is as specified. The A-MPR applies to all modulation and waveform types unless indications are received specific to modulation and waveform types:

$$P_{\text{CMAX\_L},f,c} \le P_{CMAX,f,c} \le P_{\text{CMAX\_H},f,c} \text{ with}$$

$$P_{\text{CMAX\_L},f,c} = \text{MIN} \left\{ P_{EMAX,c} - \Delta T_{C,c}, (P_{PowerClass} - \Delta P_{PowerClass}) - \right.$$

$$\text{MAX}(\text{MAX}(MPR_c + \Delta MPR_c, A - MPR_c) + \Delta TIB, c + \Delta T_{C,c} +$$

$$\left. \Delta T_{RxSRS}, P - MPR_c) \right\}$$

$$P_{\text{CMAX\_H},f,c} = \text{MIN} \{ P_{EMAX,c}, P_{PowerClass} - \Delta P_{PowerClass} \}$$

For single transmit scenarios, MPR/A-MPR is applied to the maximum output power for the single active transmitter. For dual transmit scenarios, MPR/A-MPR could be applied equally, as currently implemented, or unequally to both transmitters, according to aspects of the present disclosure. In particular, UE additional maximum output power reduction is applicable for uplink (UL) multiple input multiple output (MIMO) for UE with two transmit antenna connectors in a closed-loop spatial multiplexing scheme. The A-MPR values specified apply to the specified maximum output power. The requirements are met with specified UL MIMO configurations. For UE supporting UL MIMO, the maximum output power is defined as the sum of the maximum output power from both UE antenna connectors.

Unless stated otherwise, an A-MPR of 0 dB is used. For UE support uplink full power transmission (ULFPTx) for UL MIMO, the specified A-MPR values apply to the specified maximum output power. The requirements are met with the specified physical uplink shared channel (PUSCH) configurations, based upon support by the UE of uplink full power transmission mode. For the UE maximum output power modified by A-MPR, the specified power limits apply.

For dual transmit scenarios, especially at higher output power levels PC 2 and PC 1.5, the current drains are very high. Maintaining operation within safe thermal operating range is challenging for transmitters. In an example, high post power amplifier insertion loss is approaching 6 W power consumption on the less efficient transmit path, which can require thermal management to remain within operating temperature limits. The present disclosure addresses this and other challenges in one or more of the following aspects:

1. For a NR UE transmitting using 2 or more transmitter paths, apply MPR/A-MPR in such a way to lower overall UE current consumption/power dissipation.

2. For the MPR/A-MPR allowance specified by 3GPP for the multi-transmit case, apply a proportionately higher MPR to the less power efficient transmitter and apply a proportionately lower MPR to the more power efficient transmitter where MPRTx1 and MPRTx2 are stored in a lookup table (LUT) for each multi-transmit case.

3. The NR multi-transmit cases are primarily Transmit Diversity and UL-MIMO. This may be extended to uplink carrier aggregation (UL-CA) and uplink dual connectivity (UL-DC).

4. Additionally or alternatively, the MPRs may be determined by thermal/thermister readings of the transmitters. If the less efficient transmitter is reaching its thermal limit, apply a higher MPR to this transmitter and a lower MPR to the transmitter which is running cooler.

5. Additionally or alternatively, the MPRs may be applied to optimize TRP. One approach is based on sensing if an antenna is blocked or obstructed. In this case, apply the majority or all MPR on the obstructed antenna path.

6. Apply the MPRs based on factoring a combination of: (i) power consumption; (ii) thermal; and (iii) TRP based on predetermined priorities or weighting of these parameters by band, carrier aggregation (CA), and dual connection (DC) combination or device state information such as battery life remaining, case temperature, or radio link metrics.

In summary, aspects of the present disclosure provide one or more of the following features/advantages:

(i) A device with multiple active transmitters intelligently applies MPR to reduce overall radio current drain.

(ii) A device with multiple active transmitters intelligently applies MPR to avoid thermal overload on a transmitter branch.

(iii) A device with multiple active transmitters intelligently applies MPR to maximize TRP. MPR is disproportionately applied to the blocked antenna path. Sensor input is used to identify the blocked antenna path.

(iv) A combination of the above, based on predetermined priorities or weights.

FIG. 3 depicts TABLE A, which provides results for unequal power for dual transmit MPR cases, in accordance with one or more aspects of the disclosure. In these cases, the power backoff was applied to the transmit chain that had the highest post power amplifier (PA) loss and the PA with the lower post PA loss was maintained at 26 dBm for the top 4 cases but backed off by 1 dB for 5th case with MPR 3. In one set of conditions, the post PA loss was 1 dB higher than the better chain (5 dB and 4 dB). In the second set of conditions, the post PA loss was 2 dB higher than the better chain (6 dB and 4 dB).

Figure 4:
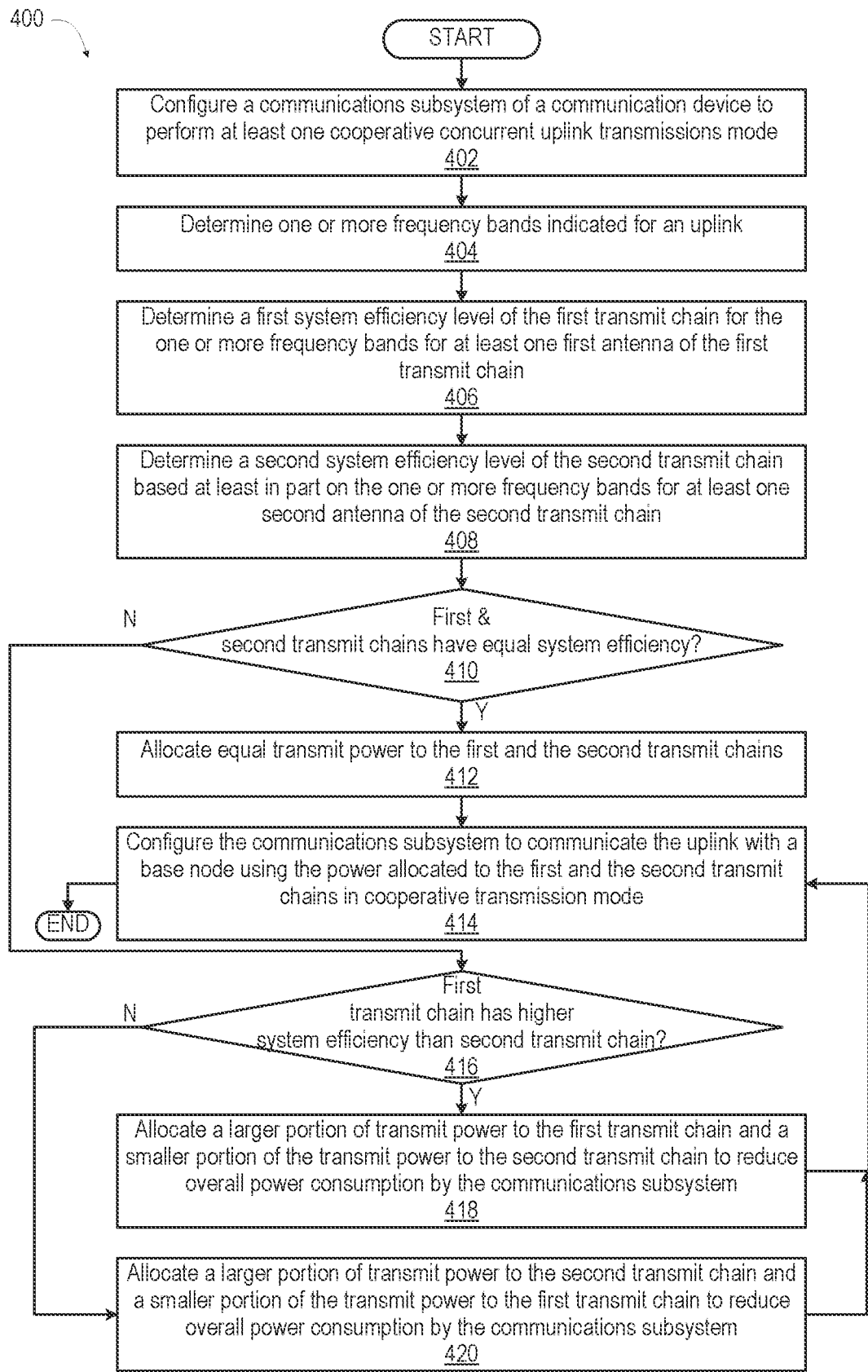
FIG. 4 provides a flow diagram presenting a method for dual transmission using allocating MPR/A-MPR for system efficiency of radiated transmit power by each transmit chain, according to one or more embodiments.

FIG. 4 provides a flow diagram presenting method 400 for dual transmission using unequally allocated MPR/A-MPR for system efficiency of radiated transmit power by each transmit chain. FIGS. 5A-5B (collectively "FIG. 5") provides a flow diagram presenting method 500 for determining system efficiency for radiated transmit power based on inherent steady-state efficiency and dynamic system efficiency, as affected by external obstacles. FIG. 6 provides a flow diagram presenting method 600 for limiting total transmit power respectively for each transmit chain, such as for thermal management in addition to allocation of MPR/A-MPR for system efficiency. The descriptions of method 400 (FIG. 4), method 500 (FIG. 5) and method 600 (FIG. 6) are provided with general reference to the specific components illustrated within the preceding FIGS. 1-2. Specific components referenced in method 400 (FIG. 4), method 500 (FIG. 5), and method 600 (FIG. 6) may be identical or similar to components of the same name used in describing preceding FIGS. 1-2. In one or more embodiments, controller 101 (FIG. 1) configures communication device 100 (FIG. 1) or UE 206a (FIG. 2) to provide the described functionality of method 400 (FIG. 4), method 500 (FIG. 5), and method 600 (FIG. 6).

With reference to FIG. 4, method 400 includes configuring a communications subsystem of a communication device to perform at least one cooperative concurrent uplink transmissions mode (block 402). Cooperative concurrent uplink transmissions mode may be transmit diversity (TxDiv) mode or codebook based physical uplink shared channel (PUSCH) transmit with precoder [1 1] in single layer dual transmit precoder codebook mode. The communications subsystem has more than one transmit chains, including at least a first transmit chain and a second transmit chain. Method 400 includes determining one or more frequency bands indicated for an uplink (block 404). Method 400 includes determining a first system efficiency level that includes antenna efficiency of the first transmit chain for the one or more frequency bands for at least one first antenna of the first transmit chain (block 406). Method 400 includes determining a second system efficiency level that includes antenna efficiency of the second transmit chain based, at least in part, on the one or more frequency bands for at least one second antenna of the second transmit chain (block 408). Method 500 (FIG. 5) described below is an example implementation of blocks 406 and 408. Method 400 includes determining whether the first transmit chain and the second transmit chain have equal system efficiency (decision block 410). In response to determining that the first and the second transmit chains have an equal system efficiency level, method 400 includes allocating equal transmit power to the first and the second transmit chains (block 412). Method 400 includes configuring the communications subsystem to communicate the uplink with a base node using the power allocated to the first and the second transmit chains in cooperative transmission mode (block 414). Then method 400 ends.

In response to determining that the first and the second transmit chains do not have an equal system efficiency level in decision block 410, method 400 includes determining whether the first transmit chain has a higher system efficiency level than the second transmit chain (decision block 416). In response to determining that the first transmit chain has a higher system efficiency level than the second transmit chain, method 400 includes allocating a larger portion of transmit power to the first transmit chain and a smaller portion of the transmit power to the second transmit chain to reduce overall power consumption by the communications subsystem (block 418). Then method 400 returns to block 414. In response to determining that the first transmit chain does not have a higher system efficiency level than the second transmit chain (i.e., has a lower system efficiency level), method 400 includes allocating a smaller portion of transmit power to the first transmit chain and a larger portion of the transmit power to the second transmit chain to reduce overall power consumption by the communications subsystem (block 420). Then method 400 returns to block 414.

With reference to FIG. 5A, method 500 includes accessing radiated transmit efficiency values stored in memory of the communication device (block 502). In an example, an implementation of particular components in a particular layout may result in a different inherent system efficiency level for each transmit chain. The respective system efficiency may be pre-determined for each communication device or for a specific model of communication device, with this information stored in memory of the communication device. The inherent system efficiency may be steady state and predictable as an inherent characteristic. Method 500 includes accessing, in the memory, total transmit power levels that are respectively available for the first and the second transmit chains (block 504). Method 600 (FIG. 6) described below provides an example implementation of block 504 that additionally addresses design limitations and thermal management.

Alternatively, or in addition to determining inherent system efficiency, method 500 includes monitoring at least one sensor (e.g., touch sensor, external impedance sensor) configured to detect an external obstruction that currently reduces antenna efficiency of radiated transmit power of at least one transmit chain (block 506). Antenna efficiency dynamically affects system efficiency. The design efficiency of the antenna at a particular frequency is captured in steady-state system efficiency. The effects of the external obstacle on antenna efficiency, and thus changing total system efficiency, is referred herein as dynamic system efficiency. Method 500 includes determining a first dynamic system efficiency level of the first transmit chain based on the first pre-determined system efficiency, inherent in the first transmit chain, as altered currently by an environmental obstruction to radiated transmit power (block 508). Method 500 includes determining a second dynamic system efficiency level of the second transmit chain based on the second pre-determined system efficiency, inherent in the second transmit chain, as reduced or completely blocked currently by an environmental obstruction to radiated transmit power (block 510).

Method 500 includes determining whether the first transmit chain and the second transmit chain have equal system efficiency (decision block 512). In response to determining that the first and the second transmit chains have an equal system efficiency level, method 500 includes allocating equal transmit power to the first and the second transmit chains (block 514). Method 500 includes configuring the communications subsystem to communicate the uplink with a base node using the power allocated to the first and the second transmit chains in cooperative transmission mode (block 516). Then method 500 ends.

In response to determining that the first and the second transmit chains do not have an equal system efficiency level in decision block 512, method 500 proceeds to block 518 (FIG. 5B). With reference to FIG. 5B, method 500 includes determining whether the first transmit chain has a higher system efficiency level than the second transmit chain (decision block 516). In response to determining that the first transmit chain has a higher system efficiency level than the second transmit chain, method 500 includes allocating a larger portion of transmit power to the first transmit chain (block 518). The larger portion is allocated up to a transmit power limit associated with the first transmit chain. Method 500 includes allocating a remaining portion of the transmit power to the second transmit chain to reduce overall power consumption by the communications subsystem (block 520). The smaller portion is allocated up to a transmit power limit associated with the second transmit chain. The unequal allocation may be implemented by unequally allocating a maximum power reduction (MPR). In particular, method 500 may include allocating a larger portion of transmit power to the first transmit chain by applying a minority portion to none of the MPR to the first transmit chain. Method 500 may include allocating a smaller portion of the transmit power to the second transmit chain by applying a majority portion to all of MPR to the second transmit chain. The allocations reduce overall power consumption, and thereby increase overall system efficiency by the communications subsystem. The increase in overall system efficiency is thus provided by applying a majority to all of maximum power reduction (MPR) to the second transmit chain. Then, method 500 returns to block 516 (FIG. 5A). In response to determining that the first transmit chain does not have a higher system efficiency level than the second transmit chain (i.e., has a lower system efficiency level), method 500 includes allocating a larger portion of transmit power to the second transmit chain (block 522). The larger portion is allocated up to a transmit power limit associated with the second transmit chain. Method 500 includes allocating a remaining portion of the transmit power to the first transmit chain to reduce overall power consumption by the communications subsystem (block 524). The smaller portion is allocated up to a transmit power limit associated with the first transmit chain. The unequal allocation may be implemented by unequally allocating MPR in the reverse direction as described above with reference to block 518 and 520. Method 500 may include allocating a larger portion of transmit power to the first transmit chain by applying a smaller portion to none of the MPR to the first transmit chain. The method 500 includes allocating a smaller portion of the transmit power to the second transmit chain by applying a majority portion to all of MPR to the second transmit chain. Thus, overall power consumption by the communications subsystem is reduced by applying a majority to all of maximum power reduction (MPR) to the second transmit chain. Then method 500 returns to block 516 (FIG. 5A).

For clarity, system efficiency of each transmit chain is assumed to be constant across a range of transmit power settings. In one or more embodiments, system efficiency of each transmit chain varies with transmit power level as different combinations of power supply components are configured to support the transmit power. Aspects of the present disclosure may more granularly allocate transmit power between transmit chains as a function of the required total radiated transmit power and the system efficiency characteristics for each transmit chain at each allocated transmit power level.

Method 400 (FIG. 4) and method 500 (FIG. 5) are directed to managing allocations of transmit power for system efficiency in achieving radiated power. The allocation of transmit power may also be affected by thermal management considerations. Method 600 (FIG. 6) is directed to limiting transmit power allocations to particular transmit chains to increase service life and reliability of components such as power amplifiers that consume a large portion of the power during transmissions. In certain scenarios, adjustments for thermal management may not prevent the communication device from achieving the optimum system efficiency for radiated power. In other scenarios, the transmit power limitations imposed on particular transmit chains may limit the ability of the communication device to efficiently achieve the transmit power with an optimum system efficiency. In one or more embodiments, method 600 (FIG. 6) may operate independently and in parallel with method 500 (FIG. 5) setting a transmit power limit for a corresponding transmit chain that dynamically changes. Method 500 (FIG. 5) optimizes transmit power allocations for system efficiency within those dynamic transmit power limits, such as imposed for thermal management.

With reference to FIG. 6, method 600 includes accessing, in memory of the communication device, maximum transmit power data associated with inherent design capacity of the first and the second transmit chains (block 602). In one or more embodiments, the specific components to monitor and control for thermal management include power intensive components such as power amplifiers. Method 600 includes monitoring at least one first thermal sensor positioned to detect a first temperature of the first transmit chain (block 604). Method 600 includes monitoring at least one second thermal sensor positioned to detect a second temperature of the second transmit chain (block 606). Method 600 includes accessing, in memory of the communication device, thermal limit data associated with thermal management of the first and the second transmit chains (block 608). Method 600 includes determining transmit power limits respectively for the first and the second transmit chains based on the maximum transmit power data, as reduced for thermal management to avoid exceeding a respective thermal limit (block 610). Then method 600 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements and/or components, but do not preclude the presence or addition of one or more other features, integers, steps, operations, elements, components and/or groups thereof.

The corresponding structures, materials, acts and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application and to enable others of ordinary skill in the art to understand the innovation for various embodiments with various modifications as are suited to the particular use contemplated.

What is claimed is:

1. A communication device comprising:
a communications subsystem having more than one transmit chains configurable to perform at least one cooperative concurrent uplink transmissions mode, the more than one transmit chains comprising at least a first transmit chain and a second transmit chain; and
a controller communicatively coupled to the communications subsystem and which:
in response to determining that the first transmit chain has a higher system efficiency level than the second transmit chain, allocates a larger portion of transmit power to the first transmit chain and a smaller portion of the transmit power to the second transmit chain to reduce overall power consumption by the communications subsystem;
in response to determining that the first and the second transmit chains have an equal system efficiency level, allocates equal transmit power to the first and the second transmit chains; and
configures the communications subsystem to communicate an uplink with a base node using the power allocated to the first and the second transmit chains in cooperative transmission mode.

2. The communication device of claim 1, wherein the at least one cooperative transmission mode comprises transmit diversity (TxDiv) mode.

3. The communication device of claim 1, wherein the at least one cooperative transmission mode comprises codebook based physical uplink shared channel (PUSCH) transmit with precoder [1 1] in single layer dual transmit precoder codebook.

4. The communication device of claim 1, wherein, in determining the system efficiency level of the first and the second transmit chains, the controller:

identifies a first system efficiency level of the first transmit chain based on a first pre- determined efficiency value, which is inherent in the first transmit chain for radiated transmit power; and identifies a second system efficiency level of the second transmit chain based on a second pre-determined system efficiency, which is inherent in the second transmit chain for radiated transmit power.

5. The communication device of claim 4, wherein, in determining the system efficiency level of the first and the second transmit chains, the controller:

determines one or more frequency bands indicated for the uplink;

identifies a first system efficiency level of the first transmit chain based at least in part on a first pre-determined system efficiency comprising antenna efficiency for the one or more frequency bands for at least one first antenna of the first transmit chain for radiated transmit power; and identifies a second system efficiency level of the second transmit chain based at least in part on a second pre-determined system efficiency comprising antenna efficiency for the one or more frequency bands for at least one second antenna of the second transmit chain.

6. The communication device of claim 4, wherein, in determining the efficiency level of the first and the second transmit chains, the controller:

identifies a first dynamic system efficiency level of the first transmit chain based on the first pre-determined efficiency, inherent in the first transmit chain, as altered currently by an environmental obstruction to radiated transmit power; and identifies a second dynamic system efficiency level of the second transmit chain based on the second pre-determined efficiency, inherent in the second transmit chain, as altered currently by an environmental obstruction to radiated transmit power.

7. The communication device of claim 6, further comprising:

at least one sensor communicatively coupled to the controller and that detects antenna blockage of at least one first antenna of the first transmit chain and at least one second antenna of the second transmit chain;

wherein in determining the dynamic system efficiency level of the first and the second transmit chains, the controller:

determines that the first transmit chain has a higher dynamic system efficiency level based on detecting, by the at least one sensor, that the at least one second antenna of the second transmit chain is blocked; and allocates a larger portion of transmit power to the first transmit chain by applying a minority portion to none of maximum power reduction (MPR) to the first transmit chain;

allocates a smaller portion of the transmit power to the second transmit chain by applying a majority portion to all of MPR to the second transmit chain, wherein the allocations reduce overall power consumption by the communications subsystem by applying a majority to all of maximum power reduction (MPR) to the second transmit chain.

8. The communication device of claim 7, wherein the at least one sensor comprises an antenna tuning network configured to detect changes in antenna efficiency based on coupling with an external impedance.

9. The communication device of claim 7, wherein the at least one sensor comprises at least one touch sensor positioned to detect touching of a portion of the communication device proximate to a respective one of the at least one first antenna and the at least one second antenna.

10. The communication device of claim 1, further comprising:

at least one first thermal sensor communicatively coupled to the controller and that detects a first temperature of the first transmit chain;

at least one second thermal sensor communicatively coupled to the controller and that detects a second temperature of the second transmit chain; and a memory communicatively coupled to the controller and storing thermal limit data associated with thermal management of the first and the second transmit chains; and wherein the controller:

determines transmit power limits for the first and the second transmit chains based on the detected first and the second temperatures; and within respective transmit power limits, allocates respective transmit power to the first and the second transmit chains based on system efficiency.

11. A method comprising:

configuring a communications subsystem of a communication device to perform at least one cooperative concurrent uplink transmissions mode, the communications subsystem having more than one transmit chains comprising at least a first transmit chain and a second transmit chain;

in response to determining that the first transmit chain has a higher system efficiency level than the second transmit chain, allocating a larger portion of transmit power to the first transmit chain and a smaller portion of the transmit power to the second transmit chain to reduce overall power consumption by the communications subsystem;

in response to determining that the first and the second transmit chains have an equal system efficiency level, allocating equal transmit power to the first and the second transmit chains; and configuring the communications subsystem to communicate an uplink with a base node using the power allocated to the first and the second transmit chains in cooperative transmission mode.

12. The method of claim 11, wherein the at least one cooperative transmission mode comprises transmit diversity (TxDiv) mode.

13. The method of claim 11, wherein the at least one cooperative transmission mode comprises codebook based physical uplink shared channel (PUSCH) transmit with precoder [1 1] in single layer dual transmit precoder codebook.

14. The method of claim 11, wherein determining the system efficiency level of the first and the second transmit chains comprises:

determining a first system efficiency level of the first transmit chain based on a first pre- determined system efficiency, which is inherent in the first transmit chain for radiated transmit power; and determining a second system efficiency level of the second transmit chain based on a second pre-determined system efficiency, which is inherent in the second transmit chain.

15. The method of claim 14, wherein determining the system efficiency level of the first and the second transmit chains comprises:

determining one or more frequency bands indicated for the uplink;

determining a first system efficiency level of the first transmit chain based at least in part on a first pre-determined system efficiency comprising antenna efficiency for the one or more frequency bands for at least one first antenna of the first transmit chain; and determining a second system efficiency level of the second transmit chain based at least in part on a second pre-determined system efficiency comprising antenna efficiency for the one or more frequency bands for at least one second antenna of the second transmit chain.

16. The method of claim 14, wherein determining the system efficiency level of the first and the second transmit chains comprises:

determining a first dynamic system efficiency level of the first transmit chain based on the first pre-determined efficiency, inherent in the first transmit chain, as altered currently by an environmental obstruction to radiated transmit power; and determining a second dynamic system efficiency level of the second transmit chain based on the second pre-determined system efficiency, inherent in the second transmit chain, as altered currently by an environmental obstruction to radiated transmit power.

17. The method of claim 11, further comprising:

monitoring at least one sensor of the communication device that detects antenna blockage of at least one first antenna of the first transmit chain and at least one second antenna of the second transmit chain;

determining the system efficiency level of the first and the second transmit chains by determining that the first transmit chain has the higher system efficiency level based on detecting, by the at least one sensor, that the at least one second antenna of the second transmit chain is blocked; and allocating a larger portion of transmit power to the first transmit chain by applying a minority portion to none of maximum power reduction (MPR) to the first transmit chain;

allocating a smaller portion of the transmit power to the second transmit chain by applying a majority portion to all of MPR to the second transmit chain, wherein the allocations reduce overall power consumption by the communications subsystem by applying a majority to all of maximum power reduction (MPR) to the second transmit chain.

18. The method of claim 11, further comprising:

monitoring at least one first thermal sensor that detects a first temperature of the first transmit chain;

monitoring at least one second thermal sensor that detects a second temperature of the second transmit chain;

determining thermal limit data associated with thermal management of the first and the second transmit chains;

determining transmit power limits for the first and the second transmit chains based on the detected first and the second temperatures; and within respective transmit power limits, allocating respective transmit power to the first and the second transmit chains based on system efficiency.

19. A computer program product comprising:

a non-transitory computer readable storage device; and program code on the computer readable storage device that when executed by a processor associated with a communication device, the program code enables the communication device to provide functionality of:

configuring a communications subsystem of the communication device to perform at least one cooperative concurrent uplink transmissions mode, communications subsystem having more than one transmit chains comprising at least a first transmit chain and a second transmit chain;

in response to determining that the first transmit chain has a higher system efficiency level than the second transmit chain, allocating a larger portion of transmit power to the first transmit chain and a smaller portion of the transmit power to the second transmit chain to reduce overall power consumption by the communications subsystem;

in response to determining that the first and the second transmit chains have an equal system efficiency level, allocating equal transmit power to the first and the second transmit chains; and configuring the communications subsystem to communicate an uplink with a base node using the power allocated to the first and the second transmit chains in cooperative transmission mode.

20. The computer program product of claim 19, wherein the at least one cooperative transmission mode comprises one of: (i) transmit diversity (TxDiv) mode; and (ii) code-book based physical uplink shared channel (PUSCH) transmit with precoder [1 1] in single layer dual transmit precoder codebook.

* * * * *